United States Patent
Zhou et al.

(10) Patent No.: US 8,442,140 B2
(45) Date of Patent: May 14, 2013

(54) METHOD OF DESIGNING CODEBOOK FOR NETWORK MULTIPLE INPUT MULTIPLE OUTPUT COMMUNICATION SYSTEM AND METHOD OF USING THE CODEBOOK

(75) Inventors: Yongxing Zhou, Yongin-si (KR); Hua Li, Yongin-si (KR); Sung Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 12/563,234

(22) Filed: Sep. 21, 2009

(65) Prior Publication Data

US 2010/0074353 A1    Mar. 25, 2010

(30) Foreign Application Priority Data

Sep. 25, 2008 (CN) .......................... 2008 1 0168033
May 22, 2009 (KR) .......................... 10-2009-0044831

(51) Int. Cl.
  *H04L 1/02*    (2006.01)
(52) U.S. Cl.
  USPC .......................................................... 375/267

(58) Field of Classification Search .................. 375/267, 375/260, 278, 316, 346, 347, 349; 370/335, 370/342; 342/367, 368
See application file for complete search history.

(56) References Cited

U.S. PATENT DOCUMENTS

| | | | |
|---|---|---|---|
| 2006/0221907 A1 | 10/2006 | Bachl et al. | |
| 2007/0149181 A1* | 6/2007 | Lin et al. | 455/415 |
| 2007/0211813 A1 | 9/2007 | Talwar et al. | |
| 2008/0095258 A1 | 4/2008 | She et al. | |
| 2009/0268840 A1* | 10/2009 | Clerckx et al. | 375/267 |
| 2011/0080964 A1* | 4/2011 | Shamsi et al. | 375/260 |

FOREIGN PATENT DOCUMENTS

| | | |
|---|---|---|
| KR | 100715582 | 4/2007 |
| KR | 1020080015352 | 2/2008 |
| KR | 1020080065208 | 7/2008 |

* cited by examiner

*Primary Examiner* — Khai Tran
(74) *Attorney, Agent, or Firm* — NSIP Law

(57) ABSTRACT

Provided herein is a method of designing a network codebook that may be shared by a plurality of base stations. Also provided herein is a feedback method of a terminal using the network codebook. The network codebook design method may design the network codebook by processing a pre-defined first codebook based on large scale fading of the base stations. The terminal may more effectively feed back a preferred matrix indicator with respect to the network codebook.

12 Claims, 6 Drawing Sheets

METHOD OF DESIGNING CODEBOOK FOR NETWORK MULTIPLE INPUT MULTIPLE OUTPUT COMMUNICATION SYSTEM AND METHOD OF USING THE CODEBOOK

CROSS-REFERENCE TO RELATED APPLICATIONS

This application claims the benefit under 35U.S.C. §119(a) of a Chinese Patent Application No. 200810168033.1, filed on Sep. 25, 2008, and a Korean Patent Application No. 10-2009-0044831, filed on May 22, 2009, the entire disclosures of which are incorporated herein in their entireties by reference for all purposes.

BACKGROUND

1. Field

The following description relates to a method of designing a codebook that may be used in a multiple input multiple output (MIMO) communication system. More particularly, the description relates to a technology that may design a network codebook that may be shared by one or more base stations, and a method to use the network codebook.

2. Description of Related Art

With the increasing number of multimedia devices in use there is a continuing need for upgraded multimedia services that can support high quality and high speed data transmission in a wireless communication environment. A multiple input multiple output (MIMO) communication system may use multiple channels in a spatial area. The MIMO communication system may include at least one base station, or a plurality of base stations. Generally, the MIMO communication system may be classified into a multi-user MIMO communication system that may include a plurality of users and a single base station. In the current state of the art, there are also single-user MIMO communication systems that may include a single user and a single base station.

In a MIMO communication system, at least one base station and the connected terminals may use a codebook. A particular space may be quantized into a plurality of vectors or matrices. The plurality of vectors or matrices that are generated by quantizing the particular space may be stored, as the codebook, in the at least one base station and the terminals.

For each terminal a channel may be formed between the base station and the terminal. Each of the terminals may select a matrix from the matrices included in the codebook. Each of the terminals may select a vector from the vectors included in the codebook. The selection may be based on the channel that is formed between the base station and the terminals. The base station may also recognize the selected matrix or vector using the codebook. The selected matrix or vector may be used where the base station generates a precoding matrix or a precoding vector.

The plurality of base stations may be spatially separated from each other by, for example, 10 meters, 100 meters, 1000 meters, 5 kilometers, or other desired distance, and may serve as terminals in cooperation with each other or without mutual cooperation. Often times, fading will occur as a wireless signal travels between a base station and a terminal and between terminals themselves. The term fading is used to describe fluctuations in a transmitted wireless signal. For spatially separated networks, large scale fading can occur due to any number of factors, for example, reflection, diffraction, scattering, and the like.

SUMMARY

In one general aspect, a method of designing a network codebook to be shared by a plurality of base stations includes receiving information associated with large scale fading from a plurality of base stations to a terminal, designing a second codebook based on the information associated with large scale fading and a pre-defined first codebook, and designing the network codebook from the second codebook, based on a concatenated codebook that is designed from codebooks of the base stations.

The designing of the second codebook may include processing elements included in the first codebook and using a matrix that includes values associated with large scale fading.

The values associated with large scale fading may be included as diagonal elements. The large scale fading from the plurality of base stations to the terminal may be measured by the terminal itself.

The designing of the second codebook may include diagonalizing elements included in the first codebook, and designing the second codebook using a matrix that includes values associated with large scale fading and the diagonalized elements included in the first codebook.

The designing of the network codebook may include performing an inner product for elements included in the concatenated codebook and elements included in the second codebook.

The first codebook may satisfy a constant modulus criterion. The first codebook may be pre-defined based on a chordal distance between matrices that is included in the first codebook.

The network codebook design method may further include designing the concatenated codebook based on the codebooks of the base stations. The designing of the concatenated codebook may include performing an inner product for elements included in the codebooks of the base stations.

The network codebook may be used where the plurality of base stations performs precoding. The network codebook may be used where the terminal feeds back channel status information to the plurality of base stations.

The codebooks of the base stations may be used in a multiple input multiple output (MIMO) communication system that includes a single base station.

In another general aspect, a feedback method of a terminal using a network codebook includes feeding back to a first base station a preferred matrix indicator of the terminal with respect to a codebook of the first base station, and a channel quality indicator of a channel between the first base station and the terminal, and feeding back to a second base station a preferred matrix indicator of the terminal with respect to a codebook of the second base station, and a preferred matrix indicator of the terminal with respect to the network codebook. The network codebook may be shared by the first base station and the second base station.

Where there is a third base station sharing the network codebook, the feeding back to the second base station may include feeding back at least a portion of the preferred matrix indicator of the terminal with respect to the network codebook. The network codebook design method may further include feeding back to the third base station at least a portion of the preferred matrix indicator of the terminal with respect to the network codebook.

The network codebook may be designed by designing a second codebook based on information associated with large scale fading from the first base station and the second base station to the terminal, and a pre-defined first codebook, and designing the network codebook from the second codebook, based on a concatenated codebook that is designed from codebooks of the first base station and the second base station.

Other features and aspects will become apparent to those skilled in the art from the following detailed description, drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Description of well-known functions and constructions may be omitted for increased clarity and conciseness.

As a non-exhaustive illustration only, a terminal or user device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a desktop computer, a server, a global positioning system (GPS) navigation, and devices such as a desktop PC, a high definition television (HDTV), an optical disc player, a setup box, and the like capable of wireless communication or network communication consistent with that disclosed herein.

As a non-exhaustive illustration only, a base station described herein may refer to a wireless communications station installed at a fixed location, for example, a radio system or a telephone system. The base station may comprise a computing system or a computer that may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

Figure 1:
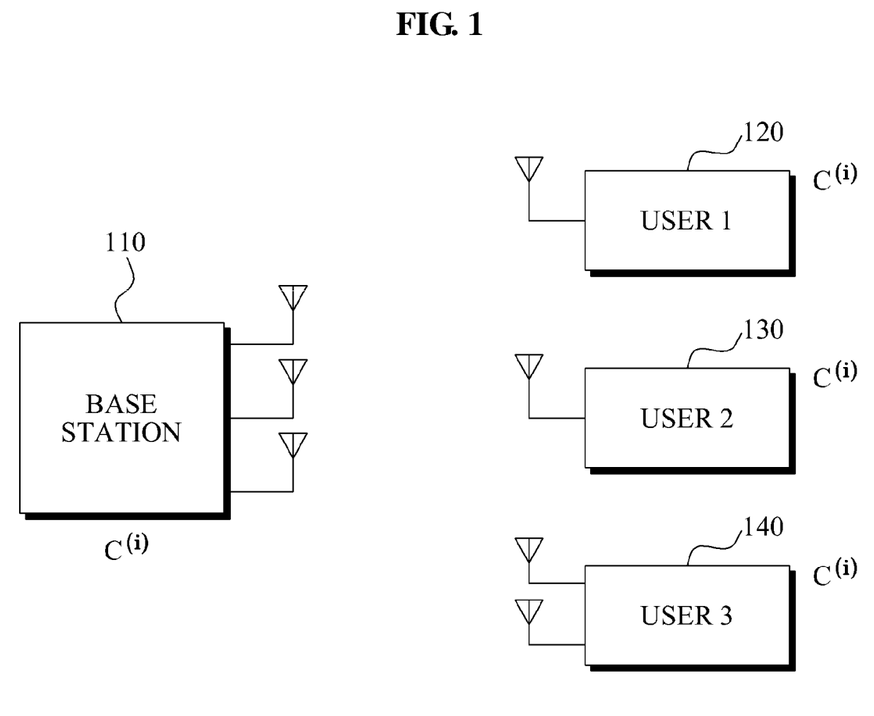
FIG. 1 is a diagram illustrating an exemplary multi-user multiple input multiple output (MIMO) communication system.

FIG. 1 illustrates an exemplary multi-user multiple input multiple output (MIMO) communication system. As shown in FIG. 1, the multi-user MIMO communication system includes a base station 110 and a plurality of users or terminals 120, 130, and 140. One or more antennas may be provided in the base station 110, for example, one, two, three, eight, fifteen, or other desired amount. At least one antenna may be provided in each of the users 120, 130, and 140. Channels may exist between the base station 110 and each of the users 120, 130, and 140. The base station 110 and each of the users 120, 130, and 140 may transmit and receive signals via the channels.

The base station 110 may transmit at least one data stream to one or more of the plurality of users 120, 130, and 140. The base station 110 may perform beamforming for the at least one data stream. The beamforming may be performed according to known standards in the art, for example, the beamforming may be performed according to a spatial division multiplexing access (SDMA) scheme, to generate a transmission signal. The base station 110 may generate a precoding matrix using a codebook $C^{(i)}$, and generate the transmission signal using the precoding matrix. The codebook may be defined as $C^{(i)} \triangleq \{v_1^{(i)}, v_2^{(i)}, \ldots, v_{2^{B(i)}}^{(i)}\}$, and may include $2^{B(i)}$ matrices or vectors. In this example, i denotes an index of the base station 110.

The base station 110 may transmit pilot signals to the plurality of users 120, 130, and 140 via downlink channels. The pilot signals may be well known to the base station 110 and the plurality of users 120, 130, and 140. Each of the users 120, 130, and 140 may receive the pilot signals to estimate the downlink channels formed between the base station 110 and the users 120, 130, and 140.

Each of the users 120, 130, and 140 may select, as a preferred matrix or a preferred vector, any one matrix or vector from the matrices or the vectors included in the codebook $C^{(i)}$. Each of the users 120, 130, and 140 may select, as the preferred matrix or the preferred vector, any one matrix or vector from the $2^{B(i)}$ matrices or vectors according to various criteria. For example, each of the users 120, 130, and 140 may select, as the preferred matrix or the preferred vector, any one matrix or vector from the $2^{B(i)}$ matrices or vectors by considering an achievable data rate or a signal-to-interference and noise ratio (SINR). The term each is not meant to limit the terminals such that each must perform the same operation. Each user or terminal may be configured to be operated independently of the other users or terminals. Each user or terminal may select a preferred matrix independently of each of the other users or terminals.

Each of the users 120, 130, and 140 may feed back information to the base station 110. The information may be associated with the selected preferred vector or preferred matrix. Information associated with the selected preferred vector or the preferred matrix may be referred to as a channel direction indicator, a preferred matrix indicator, or a precoding matrix indicator.

The base station 110 may receive information associated with the preferred vector of the preferred matrix of each of the users 120, 130, and 140, to determine the precoding matrix. The base station 110 may determine the precoding matrix according to various types of precoding schemes, for example, a zero forcing scheme, a per user unitary rate control (PU2RC) scheme, and the like.

In addition to the codebook for the multi-user MIMO communication system of FIG. 1, various types of codebooks, for example, a codebook for a single-user MIMO communication system, and a codebook for a dual polarization system, may be defined in a standard such as a 3$^{rd}$ Generation Partnership Project (3GPP) Long Term Evolution (LTE) standard, an Institute of Electrical and Electronics Engineers (IEEE) 802.16m standard, and the like. Codebooks defined in so-far published standards and suggestions relate to the multi-user MIMO communication that includes a single base station.

A network codebook shared by a plurality of base stations in a network MIMO communication system may not have been clearly defined in the art. Accordingly, in one aspect, there is provided a network codebook that is shared by a plurality of base stations and applicable to a network MIMO communication system without modifying the so-far defined codebook for a multi-user MIMO communication system that includes only a single base station. In another aspect, there is provided a network codebook that may prevent or lessen the loss of signal resulting from large scale fading.

Figure 2:
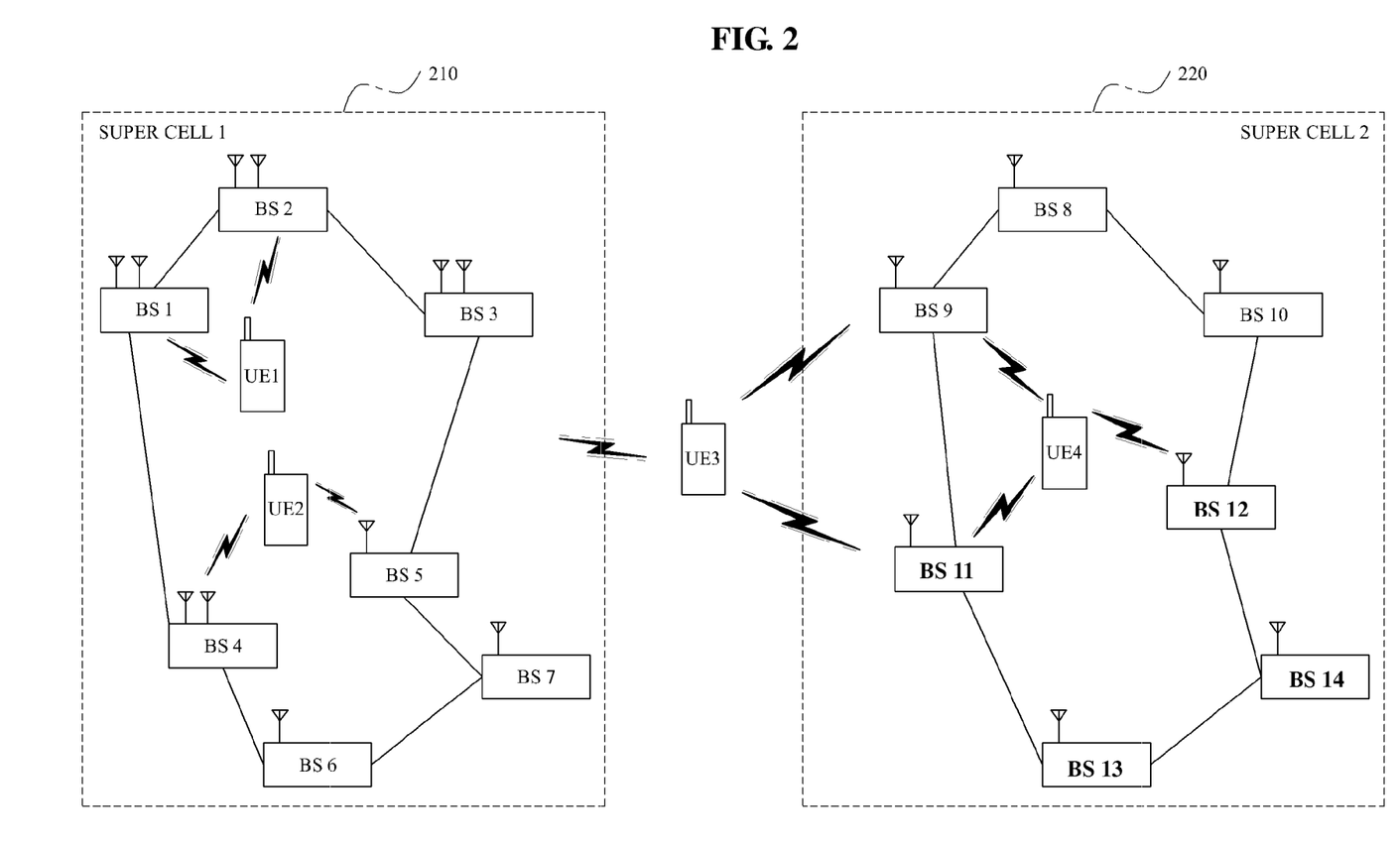
FIG. 2 is a diagram illustrating an exemplary network MIMO communication system including a plurality of super cells.

FIG. 2 illustrates an exemplary network MIMO communication system that includes a plurality of super cells, for example, a super cell 210 and a super cell 220.

As shown in FIG. 2, the super cell 210 may include a plurality of base stations, for example, seven base stations (BS1, BS2, BS3, BS4, BS5, BS6, and BS7). The super cell 220 may include a plurality of base stations, for example, seven base stations (BS8, BS9, BS10, BS11, BS12, BS13, and BS14). The number of base stations in a super cell is not limited to seven. Any desired number of base stations can be used per super cell.

Here, it is assumed that a codebook $C^{(i)}$ having a B-bit size for an $i^{th}$ base station in super cell 210 and super cell 220 is $C^{(i)} \triangleq \{v_1^{(i)}, v_2^{(i)}, \ldots, v_{2^{B(i)}}^{(i)}\}$. The codebook $C^{(i)}$ may include $2^{B(i)}$ matrices, and each of the $2^{B(i)}$ matrices may have a size of $M_i \times r$. In this example, $M_i$ denotes a number of antennas provided in an $i^{th}$ base station. For example, $M_1$ corresponding to the number of antennas at the base station BS1 is two and $M_5$ corresponding to the number of antennas at the base station BS5 is one. In this example, r denotes a rank. In a 3GPP LTE, the rank may be set to one for a multi-user MIMO mode, and may be ranged from one to $\min(M_i, N_k)$ for a single-user MIMO mode. Here, $N_k$ denotes a number of antennas of a user k.

As described above, $C^{(i)} \triangleq \{v_1^{(i)}, v_2^{(i)}, \ldots, v_{2^{B(i)}}^{(i)}\}$ denotes a codebook that is defined with respect to a multi-user MIMO communication system that may include a single base station, and may be a codebook defined in the 3GPP LTE standard, the IEEE 802.16m standard, and the like.

The user k may measure channels from other base stations using well-known signals, for example, pilot signals.

The user k may order the base stations based on greatest pilot signal strength to least pilot signal strength, respectively, and vice versa. For example, a base station corresponding to a pilot signal with the greatest received signal strength may be indexed to one. A base station corresponding to a pilot signal with an $i^{th}$ greatest received signal strength may be indexed to i. A base station corresponding to a pilot signal with a $p^{th}$ received signal strength may be indexed p, and so forth.

For example, let $L_{i \to k}$ denote large scale fading associated with a channel from the $i^{th}$ base station to the user k, and be measured by the user k. The large scale fading may be equal to a sum of path loss and shadowing. The large scale fading may be replaced by other values associated with the channel from the $i^{th}$ base station to the user k.

Described herein is a method of designing a network codebook shared by a plurality of base stations. The network codebook may be shared by the plurality of base stations included in the same super cell. The plurality of base stations may perform precoding using the network codebook in a super cell level, and a terminal may feed back channel status information to the plurality of base stations, for example, a channel direction indictor, a preferred matrix indicator, a channel quality indicator, and the like, using the network codebook. The network codebook may be designed according to the following procedure:

1) Concatenation of Codebooks of the Base Stations

A terminal may index codebooks of base stations according to a measured magnitude of large scale fading. When the codebooks of the base stations are $C^{(1)}, \ldots, C^{(i)}, \ldots, C^{(p)}$, a concatenated codebook may be represented by $C_C \triangleq \{u_1, u_2, \ldots, u_{2^{\Sigma B(i)}}\}$. Each element in the concatenated codebook $C_C$ may be represented by the following Equation 1:

$$u = [(v_x^{(1)})^T \ldots (v_y^{(i)})^T \ldots (v_z^{(p)})^T]^T \, x\epsilon[1,2^{B(1)}], \\ y\epsilon[1,2^{B(i)}], z\epsilon[1,2^{B(p)}].$$

2) Introduction of First Codebook D

A first codebook D may be defined. The first codebook D may be used to design a network codebook. Each of matrices included in the first codebook D may have a p×r matrix, and each of columns vectors included in the matrices may be a unit norm vector. The first codebook D may be represented by the following Equation 2.

$$D \triangleq \{w_1, w_2, \ldots, w_{2^B}\}.$$

The first codebook D may satisfy a constant modulus criterion. The first codebook D may be pre-defined based on a chordal distance between the matrices included in the first codebook D. In particular, the first codebook D may be defined to maximize the chordal distance between the matrices with respect to a given rank r.

3) Definition of Matrix Q

A matrix Q may be used to weight matrices included in the first codebook D. The matrix Q may be used to weight matrices based on values indicating large scale fading. Matrix Q may be defined as given by the following Equation 3:

$$Q = \text{diag}\{1, \ldots, \sqrt{L_{1 \to k}/L_{i \to k}}, \ldots, \sqrt{L_{1 \to k}/L_{r \to k}}\}.$$

The diag{a, b, c, d} denotes a diagonal matrix and includes a, b, c, and d as diagonal elements. For example, a denotes an element in the first column and the first row of the diagonal matrix diag{a, b, c, d}, and d denotes an element in the fourth column and the fourth row of the diagonal matrix diag{a, b, c, d}.

4) Design of Second Codebook E

A second codebook E, may be used as a medium to design a network codebook F based on the matrix Q and the first codebook D. Second codebook E may be designed as given by the following Equation 4:

$$E \triangleq \{Q \cdot \text{diag}(w_1), Q \cdot \text{diag}(w_2), \ldots, Q \cdot \text{diag}(w_{2^B})\}.$$

5) Design of Network Codebook F

Any element or matrix t in the network codebook F may be defined by the following Equation 5:

$$t = Q \cdot \text{diag}\{w_i\} \cdot u_j,$$

where $u_j$ denotes a $j^{th}$ element among elements included in $C_C$.

Figure 3:
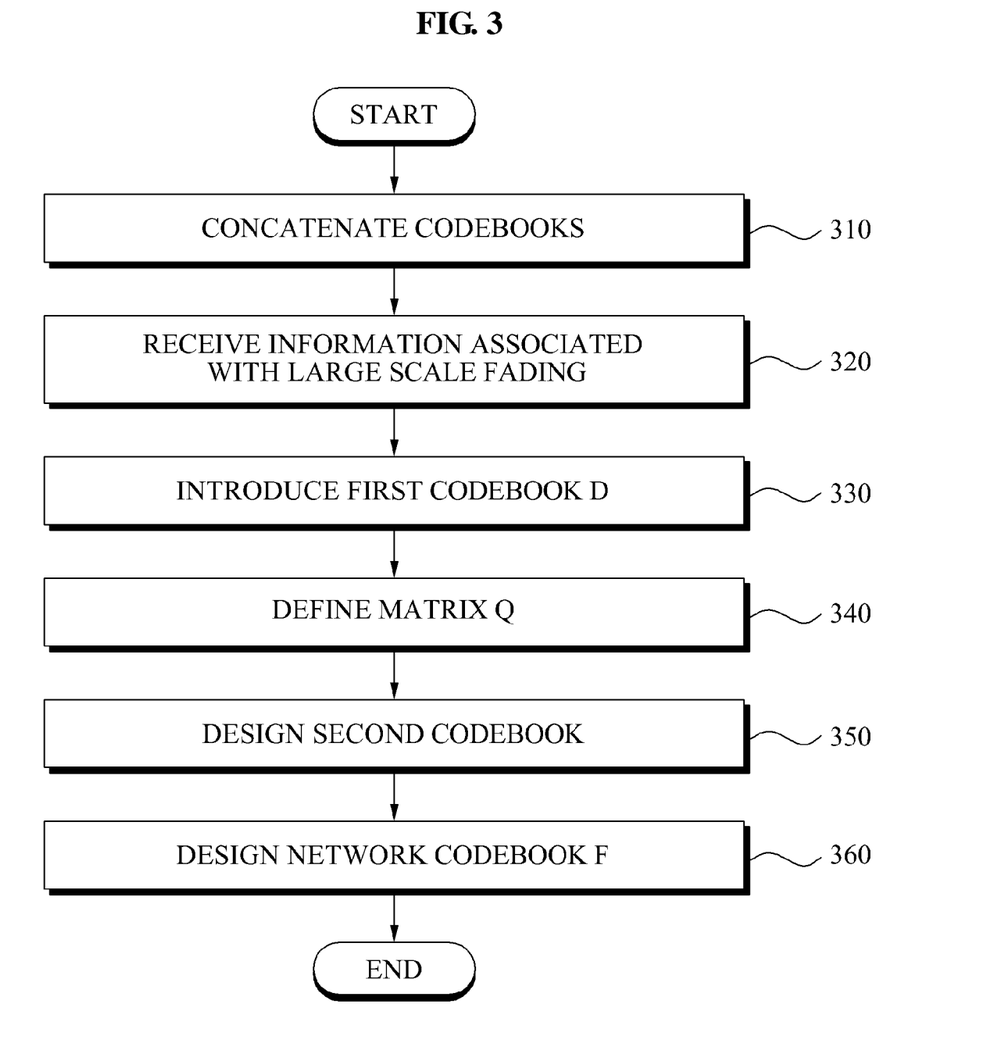
FIG. 3 is a flowchart illustrating an exemplary method of designing a network codebook.

FIG. 3 illustrates an exemplary method of designing a network codebook. As illustrated in FIG. 3, the network codebook design method concatenates codebooks of base stations associated with a target terminal in operation 310. As known from the above Equation 1, the concatenated codebook may be defined by performing an inner product for elements included in the codebooks of the base stations.

In operation 320, the network codebook design method receives information associated with large scale fading. For example, the terminal may provide information associated with the measured large scale fading to an internal module, and information associated with the large scale fading may be provided from the terminal to the base stations.

In operation 330, the network codebook design method introduces a first codebook D. The first codebook D may be introduced by satisfying a constant modulus or considering a chordal distance.

In operation 340, the network codebook design method defines a matrix Q based on information associated with the large scale fading. The matrix Q may include values associated with the large scale fading. The matrix Q may comprise diagonal elements as shown in the above Equation 3.

In operation 350, the network codebook design method designs a second codebook E based on the first codebook D and the values associated with the large scale fading.

The network codebook design method may design the second codebook E using the matrix Q that includes the values associated with the large scale fading, and the diagonalized elements of the first codebook D. As shown above, for example, the network codebook design method may diagonalized elements of the second codebook E, for example, $\text{diag}(W_1)$ and $\text{diag}(W_2)$ of the above Equation 4

In operation 360, the network codebook design method designs a network codebook F from the second codebook E, based on the concatenated codebook.

As shown in the above Equation 5, the network codebook design method may design the network codebook F by performing an inner product for the elements included in the concatenated codebook and the elements included in the second codebook E.

Figure 4:
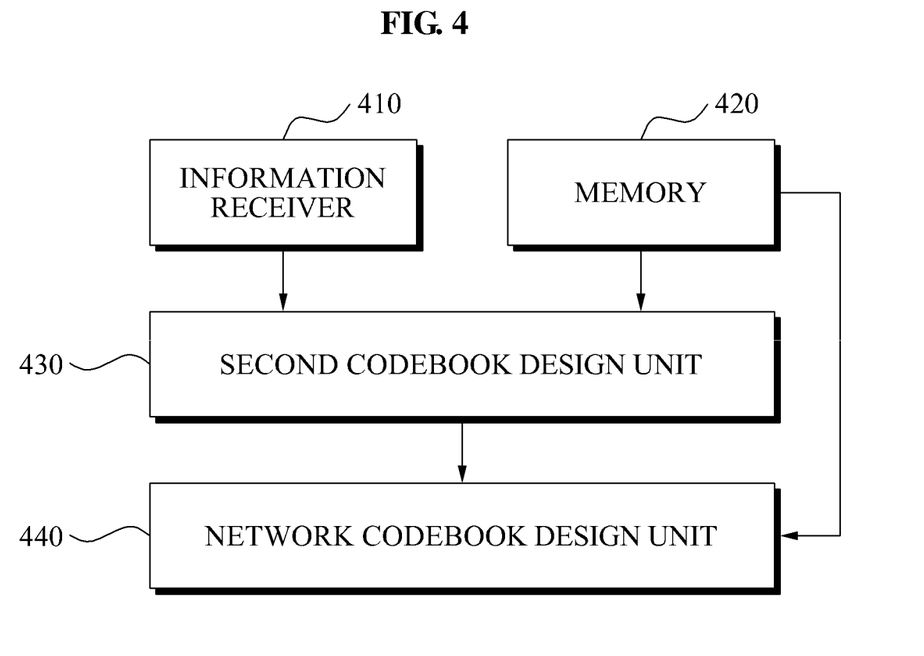
FIG. 4 is a block diagram of an exemplary network codebook design apparatus.

FIG. 4 illustrates an exemplary network codebook design apparatus. As shown in FIG. 4, the network codebook design apparatus includes an information receiver 410, a memory 420, a second codebook design unit 430, and a network codebook design unit 440. The network codebook design apparatus may be in electronic communication with a base station or a terminal, and thereby operate.

The information receiver 410 may receive information associated with large scale fading from a plurality of base stations to the terminal.

The memory 420 may store a pre-defined first codebook and codebooks of the base stations or a concatenated codebook.

The second codebook design unit 430 may design a second codebook based on the stored first codebook.

The network codebook design unit 440 may design a network codebook from the second codebook based on the concatenated codebook.

Examples of operating a network codebook design apparatus according to various embodiments will be described. For this example, a super cell includes four base stations (1, 2, 3, 4), each of the four base stations (1, 2, 3, 4) includes two antennas, $L_{1 \to k}=1$, $L_{2 \to k}=1/2$, $L_{3 \to k}=1/3$, $L_{4 \to k}=1/4$, and a rank r is set to 1. Also, each of codebooks of the four base stations (1, 2, 3, 4) is $$C^{(1)} = C^{(i)} = C^{(p)} \triangleq \left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix}, \frac{1}{\sqrt{2}} \begin{bmatrix} 1 \\ j \end{bmatrix}, \frac{1}{\sqrt{2}} \begin{bmatrix} 1 \\ -j \end{bmatrix} \right\}$$

defined in a 3GPP LTE. A first codebook is $D \triangleq \{w_1, w_2, \ldots, w_{2^4}\}$ defined as a rank 1 codebook in the 3GPP LTE. For reference, a chordal distance between the elements of D may be 0.75 and may satisfy a constant modulus criterion.

$$w_1 = \frac{1}{2}[1 \quad 1 \quad 1 \quad 1]^T$$

-continued $$w_2 = \frac{1}{2}[1 \quad j \quad -1 \quad -j]^T$$

$$w_3 = \frac{1}{2}[1 \quad -1 \quad 1 \quad -1]^T$$

$$w_4 = \frac{1}{2}[1 \quad -j \quad -1 \quad j]^T$$

$$w_5 = \frac{1}{2}[1 \quad e^{j\frac{\pi}{4}} \quad j \quad e^{j\frac{3\pi}{4}}]^T$$

$$w_6 = \frac{1}{2}[1 \quad e^{j\frac{3\pi}{4}} \quad -j \quad e^{j\frac{\pi}{4}}]^T$$

$$w_7 = \frac{1}{2}[1 \quad e^{j\frac{5\pi}{4}} \quad j \quad e^{-j\frac{\pi}{4}}]^T$$

$$w_8 = \frac{1}{2}[1 \quad e^{-j\frac{\pi}{4}} \quad -j \quad e^{j\frac{5\pi}{4}}]^T$$

$$w_9 = \frac{1}{2}[1 \quad 1 \quad -1 \quad -1]^T$$

$$w_{10} = \frac{1}{2}[1 \quad j \quad 1 \quad j]^T$$

$$w_{11} = \frac{1}{2}[1 \quad -1 \quad -1 \quad 1]^T$$

$$w_{12} = \frac{1}{2}[1 \quad -j \quad 1 \quad -j]^T$$

$$w_{13} = \frac{1}{2}[1 \quad 1 \quad 1 \quad -1]^T$$

$$w_{14} = \frac{1}{2}[1 \quad 1 \quad -1 \quad 1]^T$$

$$w_{15} = \frac{1}{2}[1 \quad -1 \quad 1 \quad 1]^T$$

$$w_{16} = \frac{1}{2}[1 \quad -1 \quad -1 \quad -1]^T$$

Since D includes 16 elements and each of the codebooks of four base stations (1, 2, 3, 4) includes four elements, the network codebook F may include 4×4×4×4×16=4096 vectors. Each of the 4096 vectors may have a 8×1 dimension. With respect to $$C^{(1)} = C^{(i)} = C^{(p)} \triangleq \left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix}, \frac{1}{\sqrt{2}} \begin{bmatrix} 1 \\ j \end{bmatrix}, \frac{1}{\sqrt{2}} \begin{bmatrix} 1 \\ -j \end{bmatrix} \right\},$$

it is assumed that a preferred matrix indicator (PMI) from a user k to the base station 1 is "1", a PMI from the user k to the base station 2 is "3", a PMI from the user k to the base station 3 is "2", and a PMI from the user k to the base station 4 is "1". The PMI denotes an index of elements included in a codebook. PMI "1" denotes a first element $$\frac{1}{\sqrt{2}} \begin{bmatrix} 1 \\ 1 \end{bmatrix}$$

in the codebook.

For example, the element t of the network codebook F associated with a twelfth element in the codebook D may be represented as follows:

$$t = \frac{1}{\sqrt{2}} \begin{bmatrix} 1 \times 1 \times 1 \\ 1 \times 1 \times 1 \\ 1 \times (-j) \times \frac{1}{\sqrt{2}} \\ j \times (-j) \times \frac{1}{\sqrt{2}} \\ 1 \times 1 \times \frac{1}{\sqrt{3}} \\ -1 \times 1 \times \frac{1}{\sqrt{3}} \\ 1 \times (-j) \times \frac{1}{\sqrt{4}} \\ 1 \times (-j) \times \frac{1}{\sqrt{4}} \end{bmatrix} = \frac{1}{\sqrt{2}} \begin{bmatrix} 1 \\ 1 \\ \frac{-j}{\sqrt{2}} \\ \frac{1}{\sqrt{2}} \\ \frac{1}{\sqrt{3}} \\ -\frac{1}{\sqrt{3}} \\ \frac{-j}{\sqrt{4}} \\ \frac{-j}{\sqrt{4}} \end{bmatrix}.$$

Descriptions made above with reference to FIGS. 1 through 3 may be applicable as is to the network codebook design apparatus of FIG. 4 and thus further detailed description related thereto will be omitted.

Figure 5:
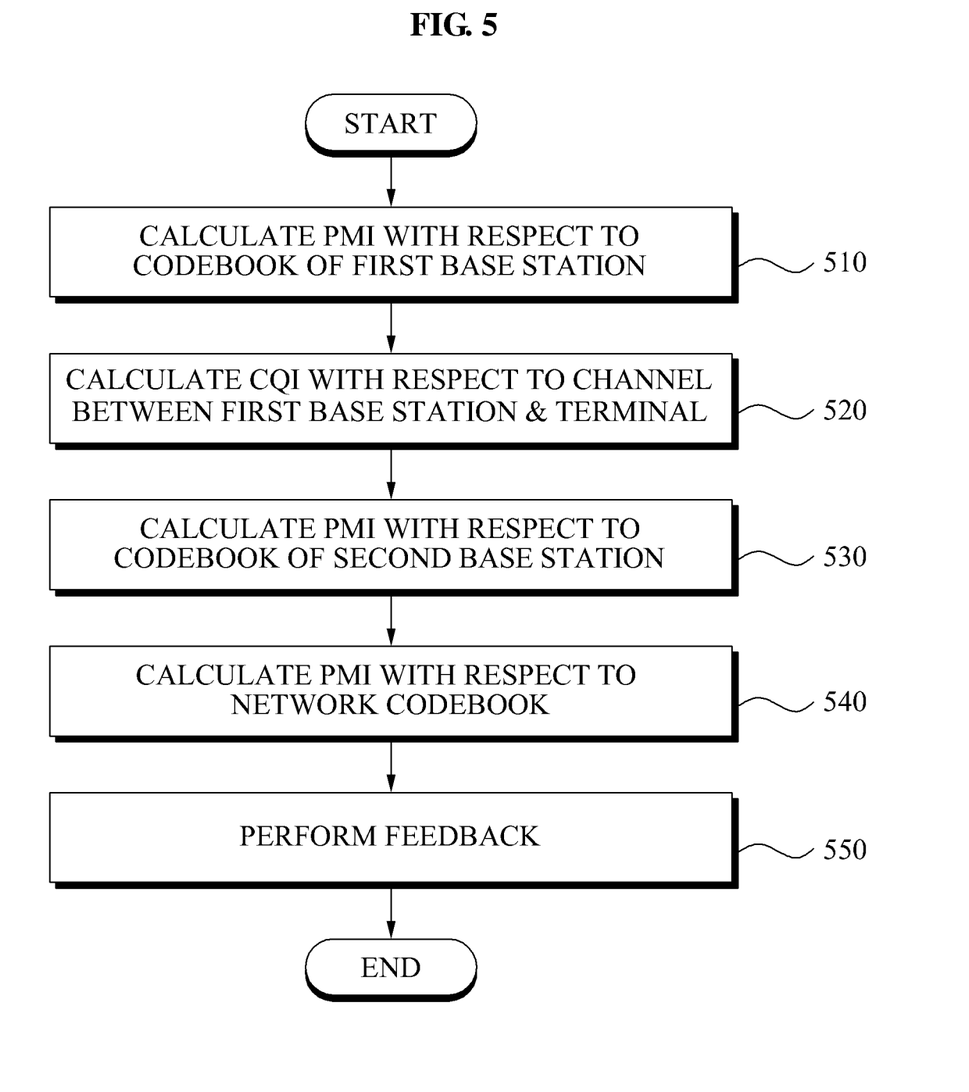
FIG. 5 is a flowchart illustrating an exemplary feedback method of a terminal.

FIG. 5 illustrates an exemplary feedback method of a terminal. Prior to describing the feedback method of a terminal, it is assumed that base stations associated with the terminal are a first base station and a second base station. Accordingly, the terminal may need to feed back channel status information to the first base station and the second base station.

For exemplary purposes, the first base station comprises a base station corresponding to a pilot signal with the greatest received signal strength and the second base station comprises a base station corresponding to a pilot signal with the second greatest received signal strength.

In operation 510, the terminal calculates a preferred matrix indicator (PMI) of the terminal with respect to a codebook $C^{(1)}$ the first base station. The PMI is associated with a channel between the first base station and the terminal. The codebook $C^{(1)}$ of the first base station denotes a codebook used by the first base station, and may be a codebook for a MIMO communication system that includes a single base station.

For example, the terminal may select, as a preferred matrix or a preferred vector, any one matrix or vector from a plurality of matrices or vectors included in the codebook $C^{(1)}$ of the first base station, and generate the preferred matrix indicator that is associated with the selected preferred matrix or preferred vector.

In operation 520, the terminal calculates a channel quality indicator (CQI) with respect to the channel between the first base station and the terminal. The CQI is a measurement of the communication quality of a wireless channel.

In operation 530, the terminal calculates a PMI with respect to a codebook $C^{(2)}$ of the second base station in association with a channel between the second base station and the terminal.

As described above, the terminal may design the network codebook by processing codebooks of the first base station and codebooks of the second base station. In operation 540, the terminal calculates a preferred matrix indicator with respect to the designed network codebook.

In operation 550, the terminal feeds back to the first base station or the second base station, the preferred matrix indicator with respect to the codebook $C^{(1)}$ of the first base station, the channel quality indicator with respect to the channel between the first base station and the terminal, the preferred matrix indicator with respect to the codebook $C^{(2)}$ of the second base station, and the preferred matrix indicator with respect to the network codebook.

For example, the terminal may feed back to the first base station, the preferred matrix indicator with respect to the codebook $C^{(1)}$ of the first base station and the channel quality indicator with respect to the channel between the first base station and the terminal. The terminal may feed back to the second base station, the preferred matrix indicator with respect to the codebook $C^{(2)}$ of the second base station. In this instance, instead of feeding back a CQI, the terminal may feed back to the second base station the preferred matrix indicator with respect to the network codebook. Feedback bits for the channel quality indicator, with respect to the channel between the second base station and the terminal, may be allocated for the preferred matrix indicator with respect to the network codebook.

In particular, the preferred matrix indicator with respect to the network codebook may be divided, and fed back to the remaining base stations excluding the first base station, for example, the second base station in the above example and a third base station. For example, when a third base station and a fourth base station further exist, the terminal may equivalently divide the preferred matrix indicator with respect to the network codebook, and feed back the divided preferred matrix indicator to the second base station, the third base station, and the fourth base station.

This preferred matrix indicator can be divided as mentioned above, instead of feeding back to the second base station, the third base station, and the fourth base station, the CQI with respect to the channel between the second base station and the terminal, the CQI with respect to a channel between the third base station and the terminal, and the CQI with respect to a channel between the fourth base station and the terminal, respectively.

Figure 6A:
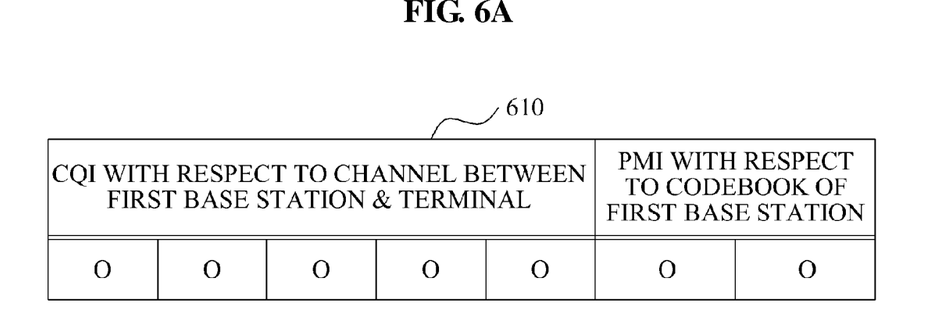
FIGS. 6A and 6B are diagrams illustrating an exemplary structure of information that is fed back by a terminal.
Figure 6B:
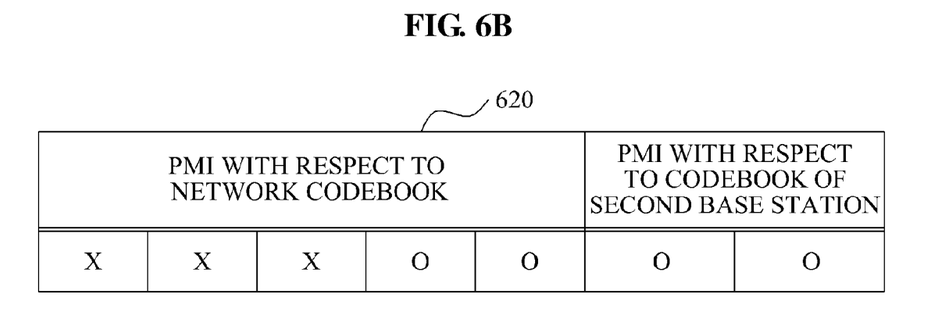

FIGS. 6A and 6B illustrate an exemplary structure of information fed back by a terminal. Here, it is assumed that base stations associated with the terminal are a first base station and a second base station. The first base station comprises a base station corresponding to a pilot signal with the greatest received signal strength, and the second base station comprises a base station corresponding to a pilot signal with the second greatest received signal strength.

Referring to table 610 of FIG. 6A, the terminal may feed back, to the first base station, a CQI with respect to a channel between the first base station and the terminal. The terminal may feed back, to the first base station, a PMI with respect to a codebook of the first base station. In the table 610, "O" indicates that a feedback bit is "being used".

Referring to a table 620 of FIG. 6B, the terminal may feed back to the second base station, a PMI with respect to a codebook of the second base station. The terminal may feed back, to the second base station a PMI with respect to a network codebook. The terminal may use remaining feedback bits, instead of feeding back to the second base station a CQI with respect to a channel between the second base station and the terminal. In the table 620, "X" denotes the feedback bits that are "not being used."

When a third base station further exists, the terminal may divide the preferred matrix indicator with respect to the network codebook, and feed back a portion of the preferred matrix indicator to the second base station. The terminal may also feed back a portion of the remaining preferred matrix indicator to the third base station.

The methods described above including a network codebook design method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

According to example(s) described above, it may be possible to process a pre-defined first codebook according to large scale fading from a plurality of base stations to a terminal and thereby more effectively design a network codebook.

Where a network codebook is designed based on codebooks for a single user MIMO communication system or a multi-user MIMO communication system, the network codebook may have an enhanced compatibility.

A terminal may perform signaling with an enhanced compatibility using such a network codebook.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a network codebook shared by a plurality of base stations, the method comprising:
   receiving information associated with large scale fading from the plurality of base stations to a terminal;
   generating a second codebook based on the information associated with large scale fading and a pre-defined first codebook; and
   generating the network codebook from the second codebook, based on a concatenated codebook that is generated from codebooks of the base stations.

2. The method of claim 1, wherein the generating of the second codebook comprises processing elements included in the first codebook and using a matrix that includes values associated with large scale fading.

3. The method of claim 2, wherein the values associated with large scale fading are included as diagonal elements.

4. The method of claim 1, wherein the generating of the second codebook comprises:
   diagonalizing elements included in the first codebook; and
   generating the second codebook using a matrix that includes values associated with large scale fading and the diagonalized elements included in the first codebook.

5. The method of claim 1, wherein the generating of the network codebook comprises performing an inner product for elements included in the concatenated codebook and elements included in the second codebook.

6. The method of claim 1, wherein the large scale fading from the plurality of base stations to the terminal is measured by the terminal.

7. The method of claim 1, wherein the first codebook satisfies a constant modulus criterion, or is pre-defined based on a chordal distance between matrices included in the first codebook.

8. The method of claim 1, further comprising:
   generating the concatenated codebook based on the codebooks of the base stations.

9. The method of claim 8, wherein the generating of the concatenated codebook comprises performing an inner product for elements included in the codebooks of the base stations.

10. The method of claim 1, further comprising precoding the plurality of base stations using the network codebook, and the terminal feeds back channel status information to the plurality of base stations.

11. The method of claim 1, wherein the codebooks of the base stations are used in a multiple input multiple output (MIMO) communication system that includes a single base station.

12. A non-transitory computer-readable storage medium storing a program to implement a method of generating a network codebook shared by a plurality of base stations, comprising instructions to cause a computer to:
   receive information associated with large scale fading from the plurality of base stations to a terminal;
   generate a second codebook based on the information associated with large scale fading and a pre-defined first codebook; and
   generate the network codebook from the second codebook, based on a concatenated codebook that is generated from codebooks of the base stations.

* * * * *